(12) United States Patent
Heggdal

(10) Patent No.: US 6,940,054 B1
(45) Date of Patent: Sep. 6, 2005

(54) PRODUCTION/INJECTION LINE AND METHODS RELATING TO SAME

(75) Inventor: Ole A. Heggdal, Finstadjordet (NO)

(73) Assignee: Kvaerner Oilfield Products AS, Lysaker (NO)

( * ) Notice: Subject to any disclaimer, the term of this patent is extended or adjusted under 35 U.S.C. 154(b) by 42 days.

(21) Appl. No.: 10/070,214

(22) PCT Filed: Aug. 18, 2000

(86) PCT No.: PCT/NO00/00270

§ 371 (c)(1),
(2), (4) Date: Oct. 18, 2002

(87) PCT Pub. No.: WO01/16515

PCT Pub. Date: Mar. 8, 2001

(30) Foreign Application Priority Data

Aug. 20, 1999 (NO) ............................................ 994044

(51) Int. Cl.[7] ............................... H05B 6/10; F16L 9/19
(52) U.S. Cl. ....................... 219/629; 219/635; 219/665; 219/388; 392/314; 138/149
(58) Field of Search ................................. 219/628, 629, 219/635, 663, 665, 667, 388; 392/314, 320; 138/149

(56) References Cited

U.S. PATENT DOCUMENTS

| 3,548,158 | A | | 12/1970 | McCaskill | |
| 3,765,240 | A | * | 10/1973 | Haus, Jr. | 340/606 |
| 4,194,536 | A | | 3/1980 | Stine et al. | |
| 4,288,653 | A | | 9/1981 | Blom et al. | |
| 4,568,925 | A | * | 2/1986 | Butts | 340/605 |
| 4,798,230 | A | | 1/1989 | Hopperdietzel | |
| 5,751,895 | A | * | 5/1998 | Bridges | 392/306 |
| 5,813,106 | A | * | 9/1998 | Haug et al. | 29/429 |

FOREIGN PATENT DOCUMENTS

| CH | 353 783 | | 7/1969 | |
| JP | 11090108 A | * | 4/1999 | ......... B01D/17/025 |
| NO | 174940 | | 2/1992 | |

* cited by examiner

*Primary Examiner*—Philip H. Leung
(74) *Attorney, Agent, or Firm*—Knobbe, Martens, Olson & Bear, LLP

(57) ABSTRACT

A production/injection line including a production/injection tube and heating apparatus for heating of the production/injection tube. The line also includes insulation and heat conductive material to control the heat transfer from the heating apparatus towards the production/injection tube. A method is also described for supplying heat to a production/injection line in which cooling fluid from a process on an installation is supplied to transport channels extending along a production/injection tube. Methods are also described for manufacturing a production/injection line.

24 Claims, 5 Drawing Sheets

PRODUCTION/INJECTION LINE AND METHODS RELATING TO SAME

RELATED APPLICATIONS

This application claims the benefit of the international application PCT/NO00/00270 filed Aug. 18, 2000 and the Norwegian application 19994044 filed Aug. 20, 1999.

BACKGROUND OF THE INVENTION

1. Field of the Invention

The present invention relates to a production/injection line, comprising a production/injection tube and heating means for active heating of the tube, a method for supplying heat to a production/injection line and a method for manufacturing a production/injection line, comprising a production/injection tube which comprises a plurality of elongate members, including a core tube, which shall serve as an injection/production tube, pipes and/or cables arranged outside the core member and channel members containing channels in which the pipes and/or cables are freely movable, and a protective outer casing.

2. Description of the Related Art

Such pipelines are used for the transport of oil and/or gas between subsea installations and between subsea installations and a platform or vessel on the surface of the sea. Pipelines of this type can also be used for injection in a well.

Parallel with such production/injection lines, there are as a rule also laid one or more control cables, which are generally gathered into a control cable bundle, or a so-called "umbilical."

An umbilical of this type is known from, for example, NO 174,940 of the same applicant, where a core member, for transport of chemicals for injection in a well, is surrounded by control cables for the transfer of hydraulic fluid, electrical and optical signals, electrical power, etc.

It is known to bundle together the production line and the control cables so that these run next to each other over the whole, or parts of the distance. By this means the risk of rupture and other damage to the cables is reduced, at the same time as it becomes easier to lay them out and, if necessary, to retrieve them again. However, the cables will have to be connected separately to the equipment on the seabed or on the surface, and it is thus necessary to have both a connector for the production line and a connector for the control cables. This connecting process takes considerable time and involves significant costs, in addition to occupying a relatively large area.

From GB 1,210,206 it is known to integrate the control cables with the production line by having the control cables wound around the production line. This ensures that the production line and the control cables will always stay together.

Also, it is desirable to hold the temperature of the production fluid (oil and/or gas) in the production line as high as is practically possible, which is to say a temperature of 50–100° C. This is because a lower temperature could cause the production fluid to have a higher viscosity and, as a result, to have a reduced flow rate. In addition, it is possible for wax to form, which accumulates on the tube wall and narrows the cross section of the tube.

There have been attempts to avoid this problem by means of the pipeline according to EP 521,582, where electrical heating cables are arranged next to the pipeline. There is also arranged an insulation layer around the pipeline. In NO 170,695 the heat loss from electrical transmission elements is used to heat up the pipeline.

The disadvantage with this known art is primarily that the electrical cables require special equipment for the generation of electrical current. The heating cables require considerable energy and can also represent an explosion risk.

SUMMARY OF THE INVENTION

The present invention is characterized in that it comprises insulation means to control the heat transfer from the heating means in toward the production/injection tube.

The method for supplying heat to the production/injection line is characterized in that cooling fluid or waste fluid from a process on an installation is supplied in transport channels extending along a production/injection tube.

The heating means in one variant of the invention consists of a pipe or tube for the transport of heating fluid. The pipe or tube may be wound around the pipeline and may optionally lie in the same insulation layer as the control cables. The heating fluid may be, for example, cooling fluid or wastewater that is used to cool down motors and other equipment on board a platform or a vessel. This water may be supplied through the heating pipe or tube and can contribute towards maintaining the temperature level of the oil or the gas. Even if the cooling fluid were not to sustain a temperature of 50–100° C., it would still be useful for the heating of the production/injection line and could ensure that the insulation layer is not cooled down by the cold surrounding sea water.

In another variant of the present invention the means consists of an electrical heating cable or an electrical induction cable.

In a preferred embodiment form of the present invention, the insulation layer comprises inner and/or outer channel members arranged around the production/injection line, with the cables that are wound around the production/injection line being located within the channels inside these channel members. The channel members may also be wound continuously around the production/injection line in the same manner as the cables.

The winding of the cables and/or the channel members can be done either in helical form or as a so-called Z-winding. However, it is also entirely possible, in certain embodiments, to align the channel members parallel with the tube without winding.

In a further variant of the present invention, transport channels for heating fluid are formed directly in the channel members.

For protection of the production/injection tube and optionally other exterior pipes, these may be coated on the outside with a corrosion-preventive coating or may have an increased wall thickness in the form of a corrosion adjunct.

The method for manufacturing the production/injection line is characterized in that the pipeline is produced in a continuous production line where the pipes, cables, insulation means and channel members are laid around the core member, that inner channel members are first laid around the core member, that pipes and/or cables are then laid in longitudinal channels in the channel members, that outer channel members having longitudinal channels are then laid flush with the channels of the inner channel members so that the pipes and/or cables are enclosed by channel members, and that the insulation means are laid either as separate members or are composed of at least a portion of the channel members.

The invention shall now be described in more detail in the following, with the aid of embodiment examples and with reference to the accompanying figures, where:

DETAILED DESCRIPTION OF THE PREFERRED EMBODIMENTS

Figure 1:
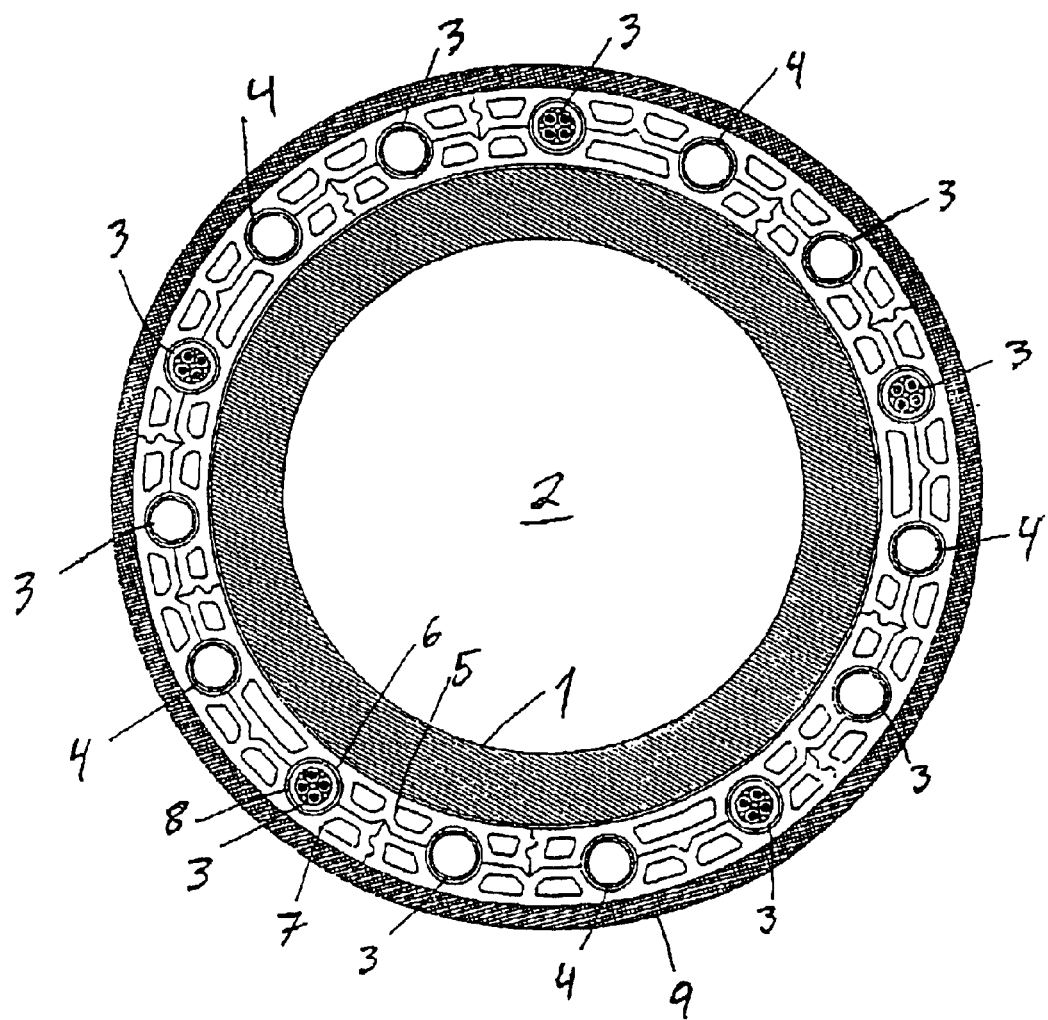
FIG. 1 shows a cross section through a production line according to the invention in a first embodiment form.

In a first embodiment form shown in FIG. 1, the production line comprises a production tube 1 having a central bore 2 therethrough for the transport of a production fluid. On the exterior of production tube 1 are wound control cables 3 and heating pipes 4. In the figure there are shown five electrical control cables, five control cables for control fluid (for example hydraulic oil) and five heating pipes, but the number of these elements and the relationship between them may, of course, be varied according to need.

A plurality of inner channel members 5 are arranged around production tube 1. In the inner channel members 5 are formed channels 6, in which the control cables and the heating pipes can be located. The outer channel member 7 is disposed exterior to inner channel members 5. Outer channel members 7 are also provided with channels 8, which respectively, together with a channel 6, form a closed cross section, in which a control cable 3 or a heating pipe 4 is located. Exterior to outer channel members 7 is provided an outer casing 9, which serves to hold channel members 5 and 7 in place, as well as to provide protection against the seawater.

The channel members 5 and 7 preferably are made of plastic, for example PVC foam, which has good thermal insulation properties. At the same time, channel members 5, 7 have a certain impact strength and can therefore serve to protect the control cables and production tube against stresses. The control cables and the heating pipes lie situated with a certain degree of play within channel members 5 and 7 and are thus able to move slightly with respect to each other and in relation to production tube 1. Channel member 5, 7 may be designed so as to have a higher heat transition coefficient on the side facing production tube 1, for example, by virtue of the fact that inner channel members 5 are thinner or consist of a material having better heat conduction properties.

The heating pipes/tubes may be designed as pipes for the transport of a heating fluid, for example water, oil or gas. Preferably there is used cooling fluid from processes on board a platform or a production vessel for heating the production line.

Figure 2:
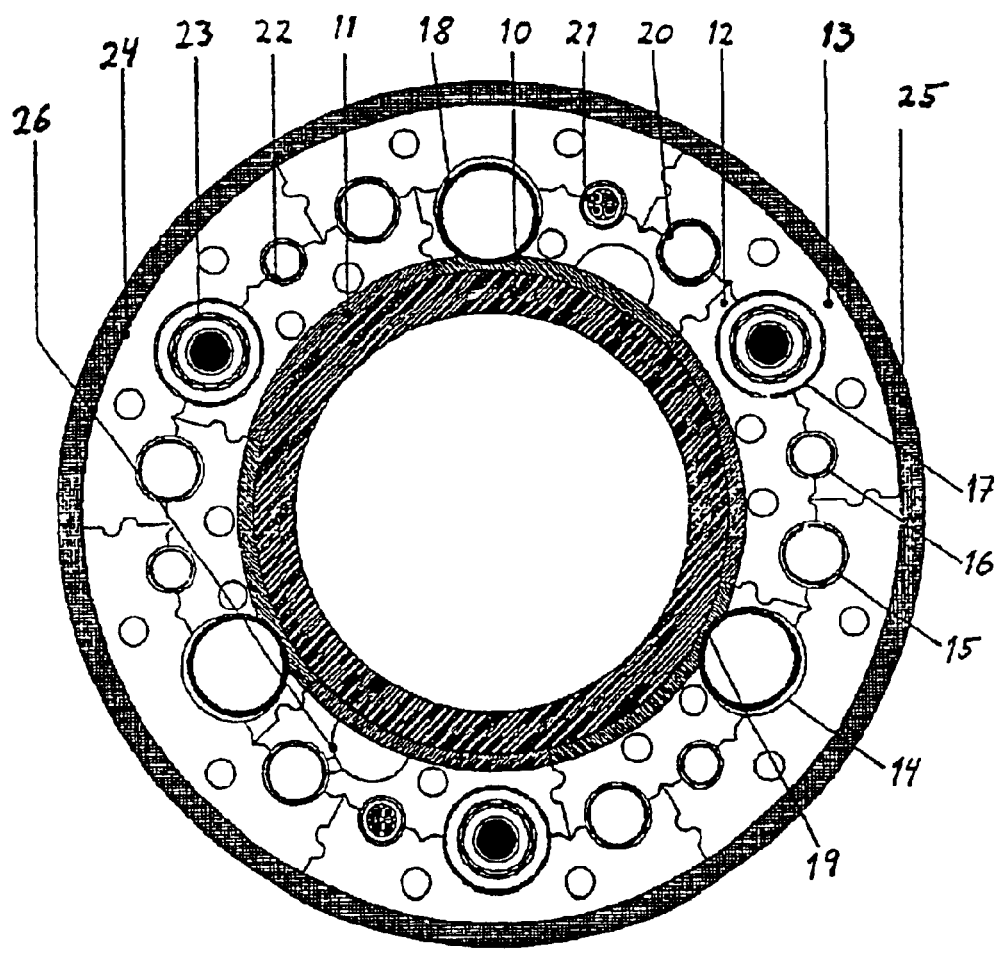
FIG. 2 shows a cross section through a production line according to the invention in a second embodiment form.

Another embodiment form in accordance with the invention is shown in FIG. 2. Here there is also provided a central production tube 10. Around production tube 10 is arranged a layer 11 of a material having good thermal conductivity. Outside conductive layer 11 are arranged inner profile members or channel members 12. These members 12 are made of a material having high thermal insulating power, for example PVC foam or solid PVC. Together with outer profile members or channel members 13, which are also produced from a material with good thermal insulation properties, they define the channels 14, 15, 16 and 17 in the inner channel member 12. In channels 14 are provided heating pipes 18, which are in good thermal contact with conductive layer 11. Preferably there are formed recesses 19 in conductive layer 11 that are adapted to the periphery of heating pipes 18.

In channels 15 are arranged fluid pipes 20 for the transfer of, for example, hydraulic oil. In channels 16 are arranged electrical signal cables 21 or fluid pipes 22. In channels 17 are arranged electrical power cables 23, preferably for the transmission of high voltage.

Outside channel members 13 is provided a reflective layer 24, which is adapted to reflect heat radiation in towards production tube 10. On the outermost surface is provided an outer casing 25, intended to hold the interior components in place and to protect them from exterior stresses, such as seawater and shocks/blows.

As an alternative or an addition to heating pipes 18, there may be formed heating channels 26 in the inner channel members 12. These heating channels may well have a semicircular cross section, enabling them to present a large surface toward conductive layer 11. Channels 26 are adapted to conduct a heat transport fluid, for example wastewater, from a process on an installation. They may well be completely sealed against leakage, but a moderate leakage can readily be tolerated.

The conductive layer may also be made of a material that provides cathodic protection for the production tube. The layer need not completely enclose the production tube, but may consist of a plurality of segments.

Figure 3:
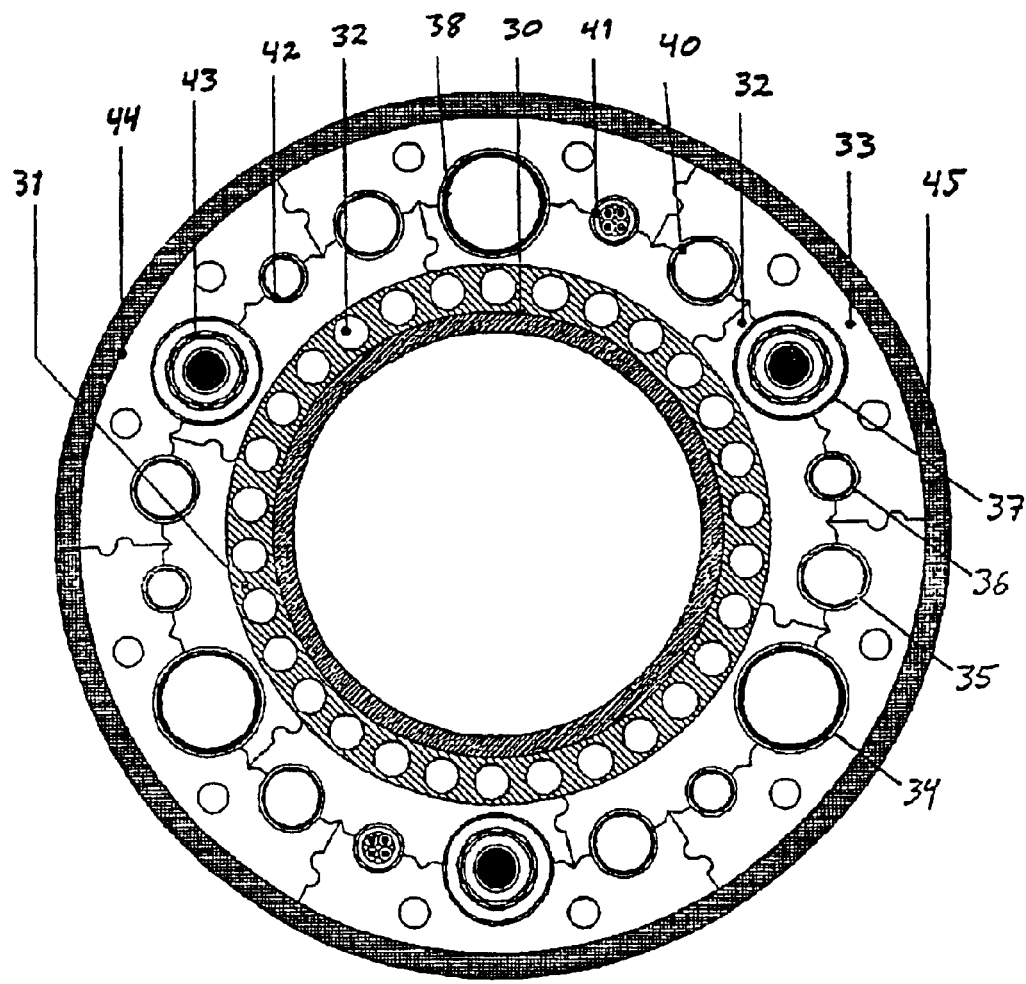
FIG. 3 shows a cross section through a production line according to the invention in another embodiment form.

In a third embodiment form, shown in FIG. 3, the production/injection line comprises a production tube 30. Exterior to this is provided a thermal jacket 31, in which are formed a plurality of heating channels 32. The thermal jacket is made of a material having good thermal conductivity. Outside thermal jacket 31 are arranged inner profile members or channel members 32. These members 32 are made of a material with high thermal insulating power, for example PVC foam or solid PVC. Together with outer profile members or channel members 33, which are also made of material having good thermal insulation properties, they define channels 34, 35, 36 and 37 of inner channel members 32. In channels 34 may be provided heating pipes 38, which function as a supplement to thermal jacket 31. Alternatively the thermal jacket may function alone as a heating device.

In channels 35 are provided fluid pipes 40 for the transmission of, for example, hydraulic oil. In channels 36 are provided electrical signal cables 41 or fluid pipes 42. In channels 37 are provided electrical power cables 43, preferably for the transmission of high voltage.

Outside channel members 33 is provided a reflective layer 44, which is adapted to reflect heat radiation in towards production tube 30. On the outermost surface is provided an outer casing 45, intended to hold the interior components in place and to protect them against exterior stresses, such as seawater and shocks blows.

The thermal jacket may be made of a material that provides cathodic protection for the production tube. The layer need not completely enclose the production tube, but may consist of a plurality of segments.

Instead of heating pipes that transport heating fluid, there may also be used electrical heating cables or electrical conductors that transmit heat with the aid of induction. In the latter case, conductive layer 11 or thermal jacket 31 may be constructed of a material that is readily heated by induction from externally situated electrical conductors. Optionally the energy loss from electrical high voltage conductors 23, 43 can be used for induction of heat in the conductive layer 11 or thermal jacket 31.

Temperature sensors may be mounted continuously along the production/injection line or at predetermined locations in order to monitor the temperature of the heating fluid and/or tubing stream. The monitoring may be either continuous or intermittent. The temperature sensors are able to transmit signals to an installation either via their own wires or via one of the other electrical cables.

The temperature sensors are preferably of fiber optic type. As examples of such optical temperature sensors are those that have been developed by I.D. FOS Research. They are fiber optic sensors based on so-called Bragg grids. These are grids that comprise a filter that allows penetration by specific wavelengths and a mirror that reflects light of particular wavelengths. The output distance between the filter and the mirror is known. A change in temperature will bring about a change in the distance between the filter and the mirror; this change in distance will, in turn, result in an alteration of the wavelength, which is possible to detect. By positioning the grids that will let through and reflect light of varying wavelengths at different locations in the optical fiber, the temperature can be measured at these locations. With current technology it is possible to have 30 test points incorporated in one and the same fiber, distributed over a distance of 2 km.

By mounting the sensor in different types of fixtures and connecting it to various additional components, it is possible to use the same type of technology also to measure tension, pressure and other parameters that may be important for the production/injection line, for example in order to monitor against leakage or damages.

Since the optical fibers are quite thin, and the sensors have a diameter that is not substantially greater than that of the actual fiber, it is quite easy to incorporate these into the production/injection line, and the sensors can therefore be placed at or very close to the location where it is most desirable to carry out the measurement.

Fiber optic sensors are unaffected by, for example, nearby electrical conductors and will therefore yield reliable measurements under extreme conditions.

Channel members 12, 13, 22, 23 and the pipes/cables are expediently coiled around the production tube in a winding process similar to the one described in Norwegian patent 174,940 by the same applicant.

A method for manufacturing the production/injection line shall now be described with reference to FIGS. 4 and 5.

Figure 4:
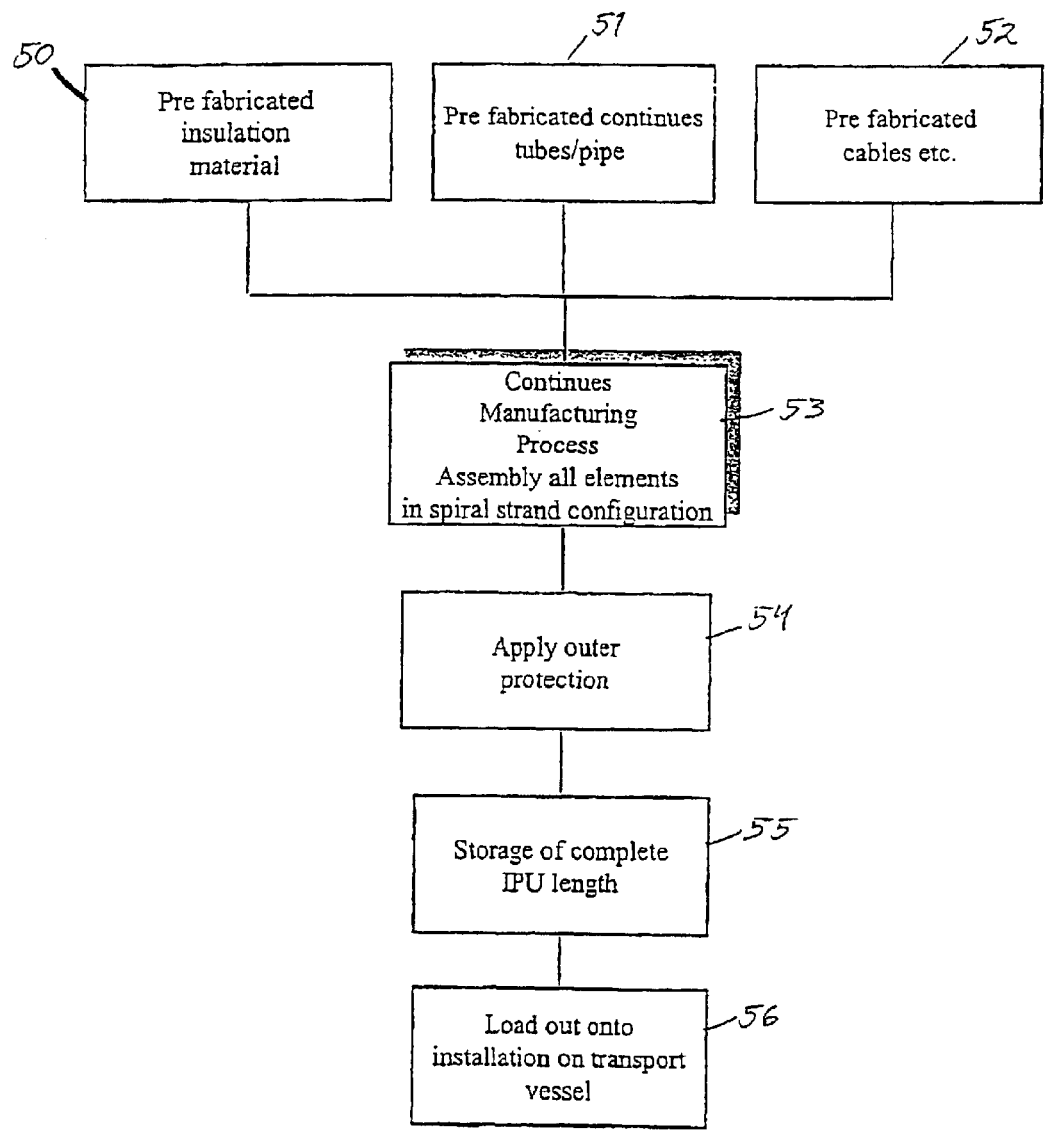
FIG. 4 shows a block diagram illustrating a method for manufacturing a production/injection line and FIG. 5 shows a manufacturing plant for the production of a pipeline.

In FIG. 4 is shown a block diagram illustrating the stages of the method. At 50 there is provided a prefabricated insulation material, which may be housed, for example, in long lengths on a roll. At 51 there are provided prefabricated tubes/pipes, which may also be supplied in long lengths on a roll, where one roll is provided for each tube to be installed in the pipeline. At 52 there are provided the various cables and other conductors, which are also supplied in long lengths on a roll, with one roll for each cable, etc.

At 53 the insulation material, pipes, cables, etc., are wrapped around the central tube in a continuous process, which shall be explained in more detail with reference to FIG. 5.

At 54 the outer protective casing is applied, at 55 the pipeline is coiled up for storage in long lengths, and at 56 the pipeline is transported to a transport vessel for installation.

Figure 5:
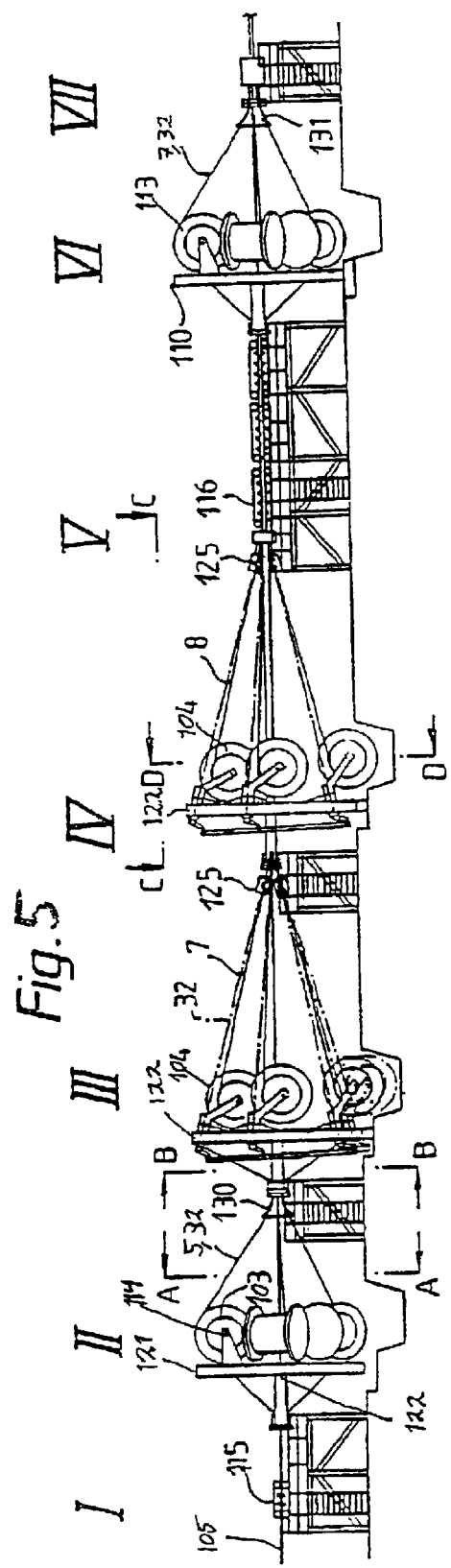

FIG. 5 shows a manufacturing plant for the continuous production of a pipeline in stage 53 according to FIG. 4. The plant comprises a plurality of stations, shown as stations I–VII, with the number of stations being dependent on the number of layers or members of which the pipeline to be manufactured will consist.

A core member 105, which can be injection/production tube 10, 30, optionally provided with a conductive layer 11 or a thermal jacket 31, is drawn in a straight line into the plant with the aid of a pulling means 115 in station I.

In station II is shown a rotating disc 121, which is rotatable about an axis 122 coincidental with the center axis of core member 115. On disc 121 is mounted a plurality of reels 103, which are rotatable about their longitudinal axes 114. Each reel 103 can be provided with a brake, if there is a need for this. Reels 103 contain coiled inner channel members 5, 32. Channel members 5, 32 are laid next to each other on the core member in a spiral configuration. A funnel means 130 ensures the proper laying of the channel members.

In station II is provided a rotating disc 122, which is similar to disc 121, but where reels 104 contain pipes, cables, etc., which are to be arranged around the core member.

Each of reels 104 is rotatably mounted on the rotating disc, such that the rotational axes of reels 104 are constantly maintained in the same direction, to prevent the pipes and cables from becoming twisted about their own axes.

Station IV is essentially the same as station III, but contains additional pipes and cables received on reels 104 on a rotating disc 122. It is of no significance per se whether pipes or cables are wound on reels 103 in station II in addition to the channel members, or which pipes or cables are received on reels 104 in station III or IV. The number of stations that will be required depends on how many pipes or cables are to be laid in the pipeline.

In station V is provided a linear pulling means 116, for example, a linear winch, which pulls in the pipes, cables and inner channel members in such a manner that these are drawn in by their respective reels. A funnel means 125 provided after each of stations III and IV ensures that the pipes and cables are laid property in channels 6, 34, 35, 36, to 37 of the inner channel members 5, 32.

In station VI is provided a rotating disc 110 having reels 113 for outer channel members 7, 33. These channel members are laid on the outside of the pipes and cables in such a manner that the outer channel members remain lying on the opposite side of the pipes and cables with respect to the inner channel members. A funnel means 131 ensures that the outer channel members are laid on properly. In other respects station VI functions in the same manner as station II.

In station VII a band and/or an outer casing is wound around the pipeline.

With the aforementioned method there can be manufactured complete injection- and/or production lines in a continuous length that far exceeds what has hitherto been accomplished. Until now it has not been possible to produce tubing lengths of a diameter greater than about 3″ in continuous lengths. With the method described above, it is possible to manufacture pipelines having a central tube with a diameter of up to 15″.

The central tube should be made of a material that permits a cold deformation of a minimum of 5–15%, so that the pipeline may be coiled one or more times on large reels.

What is claimed is:

1. A production/injection line assembly for subsea transportation of hydrocarbons, the assembly comprising:
   a production/injection tube;
   means for active heating of the tube; and
   continuous thermal insulation disposed along the production/injection line, over at least 100 m to control the heat transfer from the means for heating in towards the production/injection tube wherein the insulation comprises:
      prefabricated inner channel members having longitudinal channels, which inner channel members are laid around the production/injection tube in a continuous production line with the channels of the inner channel members facing outwardly, and
      prefabricated outer channel members having longitudinal channels, which outer channel members are laid flush with the channels of the inner channel members in a continuous production line wherein the means for heating are laid in the longitudinal channels of the inner channel members and enclosed by the outer channel members, wherein the inner and outer channel members accommodate the means for heating and wherein the inner channel members have higher heat transfer properties than the outer channel members so as to facilitate transfer of heat from the means for heating in towards the production/injection tube and to inhibit heat transfer outwards from the production/injection line assembly.

2. The assembly of claim 1, wherein the production/injection tube also comprises heat conductive material.

3. The assembly of claim 2, wherein the heat conducting material comprises a thermal conductive layer disposed between the means for heating and the production/injection tube.

4. The assembly of claim 3, wherein recesses are formed in the conductive layer, which recesses are adapted to conform to the periphery of the means for heating.

5. The assembly of claim 4, wherein the heat conductive material comprise at least one channels, for the transport of heating fluid, formed in the insulation layer, which channels are in thermal contact with the production/injection tube.

6. The assembly of claim 3, wherein the thermal conductive layer is made of a material that provides cathodic protection for the production/injection tube.

7. The assembly of claim 2, wherein the heat conducting material comprises a heat reflective layer disposed outside the means for heating.

8. The assembly of claim 1, wherein the means for heating comprise at least one heating pipes/tubes for the transport of a heating fluid.

9. The assembly of claim 1, wherein the means for heating comprises at least one electrical heating cables.

10. The assembly of claim 1, wherein the inner channel members have an opening into the longitudinal channel of the channel member, the opening facing the production/injection tube.

11. The assembly of claim 1, wherein the means for heating comprises a thermal jacket in which are formed heating fluid channels, which jacket is in thermal contact with the production/injection tube.

12. The assembly of claim 1, further comprising a sensor is installed along the production/injection line.

13. The assembly of claim 12, wherein the sensor is an optical sensor.

14. The assembly of claim 13, wherein the sensor is a Bragg type sensor.

15. The assembly of claim 12, wherein the sensor operates in a continuous manner.

16. The assembly of claim 12, wherein the sensor operates in an intermittent manner.

17. The assembly of claim 12, wherein the sensor measures at least one of temperature, pressure, tension, and leakage.

18. The assembly of claim 1, wherein the means for heating comprises at least one electrical induction cable.

19. The assembly of claim 1, wherein the inner channel members have a higher heat transfer coefficient than the outer channel members.

20. The assembly of claim 1, wherein the inner channel members are thinner in a radial direction than the outer channel members.

21. A method of supplying heat to a production/injection line, the production/injection line comprising a production/injection tube; means for active heating of the tube; and continuous thermal insulation disposed along the production/injection line, over at least 100 m to control the heat transfer from the means for heating in towards the production/injection tube wherein the insulation comprises: prefabricated inner channel members having longitudinal channels, which inner channel members are laid around the production/injection tube in a continuous production line with the channels of the inner channel members facing outwardly, and prefabricated outer channel members having longitudinal channels, which outer channel members are laid substantially flush with the channels of the inner channel members in a continuous production line wherein the means for heating are laid in the longitudinal channels of the inner channel members and enclosed by the outer channel members, wherein the inner and outer channel members accommodate the heating means for heating and wherein the inner channel members have higher heat transfer properties than the outer channel members so as to facilitate transfer of heat from the means for heating to the production/injection tube and to inhibit heat transfer outwards from the production/injection line, the method comprising supplying at least one of cooling fluid and waste fluid from a process on an installation to the longitudinal channels along the production/injection tube.

22. The method according to claim 21, characterized in that the cooling fluid is wastewater.

23. A production/injection line assembly for subsea transportation of hydrocarbons, comprising:
   a production/injection tube and arranged along the production/injection line, over a length of at least 100 m,
   continuous thermal insulation, said insulation comprising prefabricated inner channel members having first longitudinal channels, said inner channel members being laid around said production/injection tube in a continuous production line with said first channels of said inner channel members facing outwardly, and prefabricated outer channel members having second longitudinal channels, said outer channel members being laid substantially flush with said first channels of said inner channel members in the continuous production line; and
   one or more heating fluid pipes for active heating of said tube, said heating fluid pipes being laid in said first longitudinal channels of said inner channel members and enclosed by said outer channel members, wherein the channel members accommodate said heating fluid pipes and wherein the inner channel members have higher heat transfer properties than the outer channel members so as to facilitate transfer of heat from the heating fluid pipes in towards the production/injection tube and to inhibit heat transfer outwards from the production/injection line assembly.

24. A production/injection line assembly for subsea transportation of hydrocarbons, comprising:

a production/injection tube and arranged along the production/injection line, over a length of at least 100 m, continuous thermal insulation, said insulation comprising prefabricated inner channel members having first longitudinal channels, said inner channel members being laid around said production/injection tube in a continuous production line with said first channels of said inner channel members facing outwardly, and with prefabricated outer channel members having second longitudinal channels, said outer channel members being laid substantially flush with said first channels of said inner channel members in the continuous production line; and comprises one or more electrical heating cables for active heating of said tube, said electrical heating cables being laid in the said longitudinal channels of said inner channel members and enclosed by said outer channel members, wherein said channel members accommodate said electrical heating and wherein the inner channel members have higher heat transfer properties than the outer channel members so as to facilitate transfer of heat from the heating cables in towards the production/injection tube and to inhibit heat transfer outwards from the production/injection line assembly.

* * * * *

UNITED STATES PATENT AND TRADEMARK OFFICE
CERTIFICATE OF CORRECTION

PATENT NO. : 6,940,054 B1
DATED : September 6, 2005
INVENTOR(S) : Ole A. Heggdal It is certified that error appears in the above-identified patent and that said Letters Patent is hereby corrected as shown below:

<u>Title page,</u>
Item [57], ABSTRACT,
Line 7, after "fluid" insert -- or waste fluid --.

<u>Column 7,</u>
Line 63, before "installed" delete "is".

<u>Column 8,</u>
Line 20, after "control" delete "the".
Line 34, after "accommodate the" delete "heating".

<u>Column 10,</u>
Line 10, after "heating" insert -- cables --.

Signed and Sealed this

Eighteenth Day of April, 2006

JON W. DUDAS
*Director of the United States Patent and Trademark Office*